US009838932B2

(12) United States Patent
Yiu et al.

(10) Patent No.: US 9,838,932 B2
(45) Date of Patent: Dec. 5, 2017

(54) PCI PARTITION AND ALLOCATION FOR CELLULAR NETWORK

(71) Applicant: Intel Corporation, Santa Clara, CA (US)

(72) Inventors: Candy Yiu, Portland, OR (US); Youn Hyoung Heo, San Jose, CA (US); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 14/433,815

(22) PCT Filed: Oct. 30, 2013

(86) PCT No.: PCT/US2013/067575
§ 371 (c)(1),
(2) Date: Apr. 6, 2015

(87) PCT Pub. No.: WO2014/070929
PCT Pub. Date: May 8, 2014

(65) Prior Publication Data
US 2015/0245221 A1 Aug. 27, 2015

Related U.S. Application Data

(60) Provisional application No. 61/721,436, filed on Nov. 1, 2012.

(51) Int. Cl.
*H04W 36/20* (2009.01)
*H04W 28/24* (2009.01)
(Continued)

(52) U.S. Cl.
CPC .......... *H04W 36/20* (2013.01); *H04B 7/0417* (2013.01); *H04B 7/0452* (2013.01);
(Continued)

(58) Field of Classification Search
CPC ..... H04W 16/02; H04W 16/18; H04W 24/02; H04W 16/24; H04W 88/06; H04W 16/10;
(Continued)

(56) References Cited

U.S. PATENT DOCUMENTS 1,789,317 A    1/1931   McLeish
4,524,849 A    6/1985   Riddle
(Continued)

FOREIGN PATENT DOCUMENTS

CN    102340344 A    2/2012
CN    102724673 A    10/2012
(Continued)

OTHER PUBLICATIONS

"3GPP MTC Standard TTA M2M Seminar", ETRI Standards Research Center, [Online] retrieved from the internet:<edu.tta.or.kr/sub3/down.php?No=123&file=M2M_1-4.pdf>, (Oct. 23, 2012).
(Continued)

*Primary Examiner* — Rafael Pérez-Gutiérrez
*Assistant Examiner* — Martin Chang
(74) *Attorney, Agent, or Firm* — Schwegman Lundberg & Woessner, P.A.

(57) ABSTRACT

Generally discussed herein are systems and apparatuses that can implement Physical Cell Identity assignments that reduce collision or confusion of small cell identities at User Equipment and techniques for using the same. According to an example apparatus a device can be configured to estimate a location of the small cell eNodeB based on at least one of Global Positioning System (GPS) coordinates of the location of the small cell eNodeB and an RSRP measured at the small cell eNodeB, determine if the location of the small cell eNodeB is within a first region or a second region of a large cell transmission area, wherein the first and second regions do not overlap, and in response to determining which region
(Continued)

the small cell eNodeB is deployed in, assign a PCI code from a respective group of available PCI codes to the small cell eNodeB.

20 Claims, 4 Drawing Sheets

(51) Int. Cl.

| | |
|---|---|
| H04W 52/02 | (2009.01) |
| H04W 24/08 | (2009.01) |
| H04J 3/06 | (2006.01) |
| H04L 5/00 | (2006.01) |
| H04W 16/24 | (2009.01) |
| H04W 8/00 | (2009.01) |
| H04W 72/04 | (2009.01) |
| H04W 76/02 | (2009.01) |
| H04B 7/0417 | (2017.01) |
| H04B 7/0452 | (2017.01) |
| H04B 7/06 | (2006.01) |
| H04W 28/02 | (2009.01) |
| H04W 4/00 | (2009.01) |
| H04W 76/04 | (2009.01) |
| H04W 16/20 | (2009.01) |
| H04L 29/12 | (2006.01) |
| H04W 16/26 | (2009.01) |
| H04W 60/04 | (2009.01) |
| H04W 64/00 | (2009.01) |
| H04W 36/14 | (2009.01) |
| H04W 24/10 | (2009.01) |
| H04J 11/00 | (2006.01) |
| H04W 28/04 | (2009.01) |
| H04W 72/06 | (2009.01) |
| H04W 72/08 | (2009.01) |
| H04W 36/30 | (2009.01) |
| H04W 72/12 | (2009.01) |
| H04W 24/04 | (2009.01) |
| H04W 88/02 | (2009.01) |
| H04W 88/08 | (2009.01) |
| H04W 88/06 | (2009.01) |
| H04W 88/16 | (2009.01) |
| H04W 24/02 | (2009.01) |

(52) U.S. Cl.
CPC .......... *H04B 7/0626* (2013.01); *H04J 3/0614* (2013.01); *H04J 11/00* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/046* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 76/023* (2013.01); *H04W 76/046* (2013.01); *H04W 76/048* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02B 60/50* (2013.01)

(58) Field of Classification Search
CPC ..... H04W 16/12; H04W 16/32; H04W 36/04; H04W 16/14; H04W 28/16; H04W 72/04; H04W 74/02; H04W 64/00; H04W 4/04; H04W 4/025; H04W 8/005; H04W 8/065; H04W 8/08
See application file for complete search history.

(56) References Cited

U.S. PATENT DOCUMENTS

| | | | |
|---|---|---|---|
| 5,685,391 | A | 11/1997 | Gundlach |
| 6,386,320 | B1 | 5/2002 | Clavel |
| 7,965,651 | B2 | 6/2011 | Du et al. |
| 8,072,963 | B2 | 12/2011 | Suzuki |
| 8,150,477 | B2 | 4/2012 | Cho et al. |
| 8,174,957 | B2 | 5/2012 | Ko et al. |
| 8,504,086 | B2 * | 8/2013 | So ................ H04W 24/02 455/411 |
| 8,599,715 | B2 | 12/2013 | Kim et al. |
| 8,660,197 | B2 | 2/2014 | Lindgren et al. |
| 8,681,627 | B2 | 3/2014 | Choudhury et al. |
| 8,792,426 | B2 | 7/2014 | Montojo et al. |
| 8,885,458 | B2 | 11/2014 | Diachina et al. |
| 8,917,702 | B2 * | 12/2014 | Wegmann ........ H04W 36/0083 370/331 |
| 9,042,881 | B2 | 5/2015 | Kwon et al. |
| 9,100,160 | B2 | 8/2015 | Martinez Tarradell et al. |
| 9,225,399 | B2 | 12/2015 | Shan et al. |
| 9,225,759 | B2 | 12/2015 | Vannithamby et al. |
| 9,253,698 | B2 | 2/2016 | Zhang et al. |
| 9,277,471 | B2 | 3/2016 | He et al. |
| 9,332,469 | B2 | 5/2016 | Davydov et al. |
| 9,363,727 | B2 | 6/2016 | Chou et al. |
| 9,420,511 | B2 | 8/2016 | Gupta Hyde et al. |
| 9,572,077 | B2 | 2/2017 | Zhang et al. |
| 9,585,075 | B2 | 2/2017 | Khoryaev et al. |
| 9,609,564 | B2 | 3/2017 | Davydov et al. |
| 9,674,753 | B2 | 6/2017 | He et al. |
| 2001/0051994 | A1 | 12/2001 | Serizawa et al. |
| 2003/0072392 | A1 | 4/2003 | Beadle et al. |
| 2003/0226096 | A1 | 12/2003 | Shen et al. |
| 2004/0208183 | A1 | 10/2004 | Balachandran et al. |
| 2005/0008081 | A1 | 1/2005 | Yamazaki et al. |
| 2005/0026616 | A1 | 2/2005 | Cavalli et al. |
| 2005/0032555 | A1 | 2/2005 | Jami et al. |
| 2005/0117491 | A1 | 6/2005 | Sako et al. |
| 2005/0120265 | A1 | 6/2005 | Pline et al. |
| 2005/0124372 | A1 | 6/2005 | Lundby et al. |
| 2005/0135468 | A1 | 6/2005 | Asuri et al. |
| 2005/0146829 | A1 | 7/2005 | Schoenborn |
| 2005/0148348 | A1 | 7/2005 | Cramby et al. |
| 2006/0058033 | A1 | 3/2006 | Marsan et al. |
| 2006/0104379 | A1 | 5/2006 | Li et al. |
| 2006/0117155 | A1 | 6/2006 | Ware et al. |
| 2006/0126708 | A1 | 6/2006 | Van Den Bogaert |
| 2006/0286946 | A1 | 12/2006 | Akkarakaran et al. |
| 2007/0044000 | A1 | 2/2007 | Shen et al. |
| 2007/0111747 | A1 | 5/2007 | Lundby et al. |
| 2007/0291673 | A1 | 12/2007 | Demirhan et al. |
| 2007/0298725 | A1 | 12/2007 | Ryu |
| 2008/0188247 | A1 | 8/2008 | Worrall |
| 2008/0267165 | A1 | 10/2008 | Bertrand et al. |
| 2009/0129259 | A1 | 5/2009 | Malladi et al. |
| 2009/0238131 | A1 | 9/2009 | Montojo et al. |
| 2009/0245187 | A1 | 10/2009 | Nam et al. |
| 2009/0268624 | A1 | 10/2009 | Imamura et al. |
| 2010/0074109 | A1 | 3/2010 | Klingenbrunn et al. |
| 2010/0097937 | A1 | 4/2010 | Pietraski et al. |
| 2010/0113060 | A1 * | 5/2010 | Bai ................ H04W 16/14 455/453 |
| 2010/0216453 | A1 | 8/2010 | Kallin et al. |
| 2010/0272037 | A1 | 10/2010 | Lee et al. |
| 2010/0278038 | A1 | 11/2010 | Stahle et al. |

(56) References Cited

U.S. PATENT DOCUMENTS

| | | |
|---|---|---|
| 2011/0038279 A1* | 2/2011 | Cho ............... H04W 24/02 370/254 |
| 2011/0038326 A1* | 2/2011 | Davies ............ H04W 8/26 370/329 |
| 2011/0043275 A1 | 2/2011 | Fuks et al. |
| 2011/0044165 A1 | 2/2011 | Ni et al. |
| 2011/0059744 A1* | 3/2011 | Won ............... H04W 8/26 455/450 |
| 2011/0065443 A1 | 3/2011 | Yellin et al. |
| 2011/0110347 A1* | 5/2011 | Mun ............... H04W 16/02 370/338 |
| 2011/0149728 A1 | 6/2011 | Lee |
| 2011/0176502 A1 | 7/2011 | Chung et al. |
| 2011/0190000 A1 | 8/2011 | Kwun |
| 2011/0205886 A1 | 8/2011 | Maruyama et al. |
| 2011/0244877 A1 | 10/2011 | Farajidana et al. |
| 2011/0255635 A1 | 10/2011 | Lee et al. |
| 2011/0261858 A1 | 10/2011 | Baldemair et al. |
| 2011/0267854 A1 | 11/2011 | Flannery et al. |
| 2011/0294491 A1 | 12/2011 | Fong et al. |
| 2011/0300858 A1 | 12/2011 | Lee et al. |
| 2011/0310769 A1 | 12/2011 | Lee et al. |
| 2011/0319065 A1 | 12/2011 | Dalsgaard et al. |
| 2012/0033643 A1 | 2/2012 | Noh et al. |
| 2012/0039252 A1 | 2/2012 | Damnjanovic et al. |
| 2012/0039298 A1 | 2/2012 | Lee et al. |
| 2012/0052860 A1 | 3/2012 | Faronius et al. |
| 2012/0057479 A1 | 3/2012 | Maruyama et al. |
| 2012/0057519 A1 | 3/2012 | Kim et al. |
| 2012/0083283 A1 | 4/2012 | Phan et al. |
| 2012/0093124 A1 | 4/2012 | Zhang et al. |
| 2012/0102240 A1 | 4/2012 | Wei et al. |
| 2012/0106517 A1 | 5/2012 | Charbit et al. |
| 2012/0113844 A1 | 5/2012 | Krishnamurthy |
| 2012/0155406 A1 | 6/2012 | Kim et al. |
| 2012/0170508 A1 | 7/2012 | Sawai |
| 2012/0176885 A1 | 7/2012 | Lee et al. |
| 2012/0176924 A1 | 7/2012 | Wu et al. |
| 2012/0207047 A1 | 8/2012 | Liao et al. |
| 2012/0207105 A1 | 8/2012 | Geirhofer et al. |
| 2012/0213057 A1 | 8/2012 | Zhang et al. |
| 2012/0213116 A1 | 8/2012 | Koo et al. |
| 2012/0213137 A1 | 8/2012 | Jeong et al. |
| 2012/0218913 A1 | 8/2012 | Park et al. |
| 2012/0220286 A1 | 8/2012 | Chen et al. |
| 2012/0230290 A1 | 9/2012 | Seo et al. |
| 2012/0250662 A1 | 10/2012 | Kuo |
| 2012/0252518 A1 | 10/2012 | Karampatsis et al. |
| 2012/0264483 A1 | 10/2012 | Chin et al. |
| 2012/0300685 A1 | 11/2012 | Kim et al. |
| 2012/0320791 A1 | 12/2012 | Guo et al. |
| 2013/0003668 A1 | 1/2013 | Xiao et al. |
| 2013/0005385 A1 | 1/2013 | Hunukumbure et al. |
| 2013/0039439 A1 | 2/2013 | Kameya |
| 2013/0051277 A1 | 2/2013 | Hakola et al. |
| 2013/0051310 A1 | 2/2013 | Kim et al. |
| 2013/0053024 A1 | 2/2013 | Zou et al. |
| 2013/0073671 A1 | 3/2013 | Nagpal et al. |
| 2013/0077484 A1 | 3/2013 | Zhao et al. |
| 2013/0077583 A1 | 3/2013 | Kim |
| 2013/0080597 A1 | 3/2013 | Liao |
| 2013/0089065 A1 | 4/2013 | Koorapaty et al. |
| 2013/0107778 A1 | 5/2013 | Ryu et al. |
| 2013/0114587 A1 | 5/2013 | Khoryaev et al. |
| 2013/0170467 A1 | 7/2013 | Ogawa et al. |
| 2013/0195041 A1 | 8/2013 | Papasakellariou et al. |
| 2013/0195070 A1 | 8/2013 | Bashar et al. |
| 2013/0196679 A1 | 8/2013 | Widell et al. |
| 2013/0201936 A1 | 8/2013 | Chen et al. |
| 2013/0258874 A1 | 10/2013 | Khoshnevis et al. |
| 2013/0272215 A1 | 10/2013 | Khoryaev et al. |
| 2013/0294307 A1 | 11/2013 | Johansson et al. |
| 2013/0295905 A1 | 11/2013 | Islam et al. |
| 2013/0301558 A1 | 11/2013 | Zakrzewski |
| 2013/0303206 A1 | 11/2013 | Starsinic et al. |
| 2013/0329545 A1 | 12/2013 | Wu et al. |
| 2013/0343252 A1 | 12/2013 | Chakraborty et al. |
| 2014/0016614 A1 | 1/2014 | Velev et al. |
| 2014/0016714 A1 | 1/2014 | Chen et al. |
| 2014/0018085 A1 | 1/2014 | Young et al. |
| 2014/0029625 A1 | 1/2014 | Edmiston |
| 2014/0036750 A1 | 2/2014 | Yavuz et al. |
| 2014/0036795 A1 | 2/2014 | Martinez Tarradell et al. |
| 2014/0044029 A1 | 2/2014 | Chou et al. |
| 2014/0050086 A1 | 2/2014 | Himayat et al. |
| 2014/0057640 A1 | 2/2014 | Nagata et al. |
| 2014/0071952 A1 | 3/2014 | Kim et al. |
| 2014/0086174 A1 | 3/2014 | Nam et al. |
| 2014/0092733 A1 | 4/2014 | Johansson et al. |
| 2014/0094125 A1 | 4/2014 | Behravan et al. |
| 2014/0112194 A1 | 4/2014 | Novlan et al. |
| 2014/0113667 A1 | 4/2014 | Keller et al. |
| 2014/0119261 A1 | 5/2014 | Wang et al. |
| 2014/0120967 A1 | 5/2014 | Purnadi et al. |
| 2014/0226616 A1 | 8/2014 | Ihm et al. |
| 2014/0269383 A1 | 9/2014 | He et al. |
| 2014/0269779 A1 | 9/2014 | Shan et al. |
| 2014/0286215 A1 | 9/2014 | Koc et al. |
| 2014/0286302 A1 | 9/2014 | Khoryaev et al. |
| 2014/0295856 A1 | 10/2014 | Chou et al. |
| 2014/0321296 A1 | 10/2014 | Balraj |
| 2014/0357259 A1 | 12/2014 | Tomeczko et al. |
| 2015/0009928 A1 | 1/2015 | Sohn et al. |
| 2015/0029874 A1 | 1/2015 | Davydov et al. |
| 2015/0043438 A1 | 2/2015 | Fwu et al. |
| 2015/0092738 A1 | 4/2015 | Chakraborty et al. |
| 2015/0171939 A1 | 6/2015 | Davydov et al. |
| 2015/0215928 A1 | 7/2015 | Davydov et al. |
| 2015/0230179 A1 | 8/2015 | Gupta et al. |
| 2015/0230214 A1 | 8/2015 | Tong et al. |
| 2015/0230234 A1 | 8/2015 | Choi et al. |
| 2015/0237521 A1 | 8/2015 | Davydov et al. |
| 2015/0249947 A1 | 9/2015 | Zhang et al. |
| 2015/0304076 A1 | 10/2015 | Lee et al. |
| 2015/0358931 A1 | 12/2015 | Koorapaty et al. |
| 2016/0119842 A1 | 4/2016 | Zhang et al. |
| 2016/0157241 A1 | 6/2016 | He et al. |
| 2016/0183281 A1 | 6/2016 | Yeh et al. |

FOREIGN PATENT DOCUMENTS

| | | |
|---|---|---|
| CN | 104782157 A | 7/2015 |
| CN | 104782166 A | 7/2015 |
| CN | 104885514 A | 9/2015 |
| CN | 104904137 A | 9/2015 |
| CN | 104904256 A3 | 9/2015 |
| CN | 104937977 A | 9/2015 |
| CN | 105557032 A | 5/2016 |
| CN | 105637917 A | 6/2016 |
| EP | 2154918 A1 | 2/2010 |
| EP | 2369883 A1 | 9/2011 |
| EP | 2624473 A2 | 8/2013 |
| EP | 2733983 A2 | 5/2014 |
| EP | 2782389 A2 | 9/2014 |
| EP | 2915358 A1 | 9/2015 |
| EP | 2915368 A1 | 9/2015 |
| KR | 1020090093758 A | 9/2009 |
| KR | 1020110011145 A | 2/2011 |
| KR | 1020120033283 A | 4/2012 |
| KR | 1020120094369 A | 8/2012 |
| KR | 1020120096408 A | 8/2012 |
| WO | WO-0251189 A1 | 6/2002 |
| WO | WO-2004045083 A2 | 5/2004 |
| WO | WO-2004114683 A2 | 12/2004 |
| WO | WO-2011105726 A2 | 9/2011 |
| WO | WO-2011123550 A1 | 10/2011 |
| WO | WO-2011134401 A1 | 11/2011 |
| WO | WO-2011149533 A1 | 12/2011 |
| WO | WO-2012021879 A2 | 2/2012 |
| WO | WO-20120025825 | 3/2012 |
| WO | WO-2012044328 A1 | 4/2012 |
| WO | WO-2012050503 A1 | 4/2012 |
| WO | WO-2012063041 A1 | 5/2012 |
| WO | WO-2012065033 A1 | 5/2012 |

(56) References Cited

FOREIGN PATENT DOCUMENTS

| WO | WO-2012067555 A1 | 5/2012 |
|---|---|---|
| WO | WO-2012109989 A1 | 8/2012 |
| WO | WO-2012111937 A2 | 8/2012 |
| WO | WO-2012112281 A2 | 8/2012 |
| WO | WO-2012121757 A1 | 9/2012 |
| WO | WO-2012134579 A1 | 10/2012 |
| WO | WO-2012141884 A1 | 10/2012 |
| WO | WO-2012144645 A1 | 10/2012 |
| WO | WO-2013064385 A1 | 5/2013 |
| WO | WO-2014070321 A1 | 5/2014 |
| WO | WO-2014070347 A1 | 5/2014 |
| WO | WO-2014070359 A1 | 5/2014 |
| WO | WO-2014070410 A1 | 5/2014 |
| WO | WO-2014070411 A1 | 5/2014 |
| WO | WO-2014070480 A1 | 5/2014 |
| WO | WO-2014070602 A1 | 5/2014 |
| WO | WO-2014070649 A1 | 5/2014 |
| WO | WO-2014070768 A1 | 5/2014 |
| WO | WO-2014070778 A1 | 5/2014 |
| WO | WO-2014070901 A1 | 5/2014 |
| WO | WO-2014070929 A1 | 5/2014 |
| WO | WO-2014070933 A1 | 5/2014 |

OTHER PUBLICATIONS

"3GPP TSG-SA5 Meeting #86 Change Request 32.762", New Orleans. S5-123029., (Nov. 12, 2012), 14 pgs.
"U.S. Appl. No. 14/119,228, Preliminary Amendment dated Nov. 21, 2013", 9 pgs.
"U.S. Appl. No. 14/124,457, Preliminary Amendment dated Dec. 6, 2013", 7 pgs.
"U.S. Appl. No. 14/124,939, Preliminary Amendment dated Dec. 9, 2013", 9 pgs.
"U.S. Appl. No. 14/124,964, Preliminary Amendment dated Dec. 9, 2013", 9 pgs.
"U.S. Appl. No. 14/125,472, Preliminary Amendment dated Dec. 11, 2013", 9 pgs.
"U.S. Appl. No. 14/125,767, Preliminary Amendment dated Dec. 12, 2013", 11 pgs.
"U.S. Appl. No. 14/126,611, Final Office Action dated May 22, 2015", 11 pgs.
"U.S. Appl. No. 14/126,611, Non Final Office Action dated Oct. 23, 2014", 10 pgs.
"U.S. Appl. No. 14/126,611, Preliminary Amendment dated Dec. 16, 2013", 11 pgs.
"U.S. Appl. No. 14/126,611, Response filed Jan. 23, 2015 to Non Final Office Action dated Oct. 23, 2014", 12 pgs.
"U.S. Appl. No. 14/126,654, Examiner Interview Summary dated Feb. 25, 2015", 5 pgs.
"U.S. Appl. No. 14/126,654, Non Final Office Action dated Nov. 6, 2014", 34 pgs.
"U.S. Appl. No. 14/126,654, Preliminary Amendment dated Dec. 16, 2013", 10 pgs.
"U.S. Appl. No. 14/126,654, Response fled Mar. 6, 2015 to Non Final Office Action dated Nov. 6, 2014", 18 pgs.
"U.S. Appl. No. 14/126,998, Preliminary Amendment dated Dec. 17, 2013", 8 pgs.
"U.S. Appl. No. 14/127,015, Preliminary Amendment dated Dec. 17, 2013", 8 pgs.
"U.S. Appl. No. 14/127,092, Preliminary Amendment dated Dec. 17, 2013", 10 pgs.
"U.S. Appl. No. 14/127,621, Preliminary Amendment dated Dec. 19, 2013", 8 pgs.
"CSI Collision Handling for CoMP", R1-123468, 3GPP TSG RAN WG1 #70, Samsung, (Aug. 2012), 3 pgs.
"Discussion on reduction of CSI processing complexity to support CoMP", R1-124368, 3GPP TSG RAN WG1 #70bis, Samsung, (Oct. 2012), 4 pgs.
"Evaluation of MTC Device triggering", HTC, TD S2-110732, 3GPP TSG SA WG2 Meeting #83, (Feb. 2011), 2 pgs.
"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.
"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.
"Inter-RAT mobility for UE under IDC interference", 3GPP TSG-RAN WG2 #79bis; R2-124725; Agenda Item 7.6.3; LG Electronics Inc., (Oct. 8, 2012), 1 pg.
"Inter-RAT operation for in-device coexistence", 3GPP TSG RAN WG2 Meeting #80; R2125750; Agenda Item 7.6.1; Intel Corporation, (Nov. 12, 2012), 2 pgs.
"International Application Serial No. PCT/US2013/060146, International Preliminary Report on Patentability dated May 14, 2015", 7 pgs.
"International Application Serial No. PCT/US2013/060146, International Search Report dated Dec. 27, 2013", 5 pgs.
"International Application Serial No. PCT/US2013/060146, Written Opinion dated Dec. 27, 2013", 5 pgs.
"International Application Serial No. PCT/US2013/062442, International Preliminary Report on Patentability dated May 14, 2015", 11 pgs.
"International Application Serial No. PCT/US2013/062442, International Search Report dated Feb. 18, 2014", 10 pgs.
"International Application Serial No. PCT/US2013/062442, Written Opinion dated Feb. 18, 2014", 9 pgs.
"International Application Serial No. PCT/US2013/063063, International Preliminary Report on Patentability dated May 14, 2015", 6 pgs.
"International Application Serial No. PCT/US2013/063063, International Search Report dated Dec. 31, 2013", 5 pgs.
"International Application Serial No. PCT/US2013/063063, Written Opinion dated Dec. 31, 2013", 4 pgs.
"International Application Serial No. PCT/US2013/064385, International Preliminary Report on Patentability dated May 14, 2015", 10 pgs.
"International Application Serial No. PCT/US2013/064385, International Search Report dated Jan. 29, 2014", 3 pgs.
"International Application Serial No. PCT/US2013/064385, Written Opinion dated Jan. 29, 2014", 8 pgs.
"International Application Serial No. PCT/US2013/064387, International Preliminary Report on Patentability dated May 14, 2015", 6 pgs.
"International Application Serial No. PCT/US2013/064387, International Search Report dated Jan. 28, 2014", 4 pgs.
"International Application Serial No. PCT/US2013/064387, Written Opinion dated Jan. 28, 2014", 4 pgs.
"International Application Serial No. PCT/US2013/065599, International Preliminary Report on Patentability dated May 14, 2015", 6 pgs.
"International Application Serial No. PCT/US2013/065599, International Search Report dated Feb. 10, 2014", 4 pgs.
"International Application Serial No. PCT/US2013/065599, Written Opinion dated Feb. 10, 2014", 4 pgs.
"International Application Serial No. PCT/US2013/066786, International Preliminary Report on Patentability dated May 14, 2015", 8 pgs.
"International Application Serial No. PCT/US2013/066786, International Search Report dated Feb. 12, 2014", 4 pgs.
"International Application Serial No. PCT/US2013/066786, Written Opinion dated Feb. 12, 2014", 6 pgs.
"International Application Serial No. PCT/US2013/067043, International Preliminary Report on Patentability dated May 14, 2015", 8 pgs.
"International Application Serial No. PCT/US2013/067043, International Search Report dated Feb. 25, 2014", 4 pgs.

(56) References Cited

OTHER PUBLICATIONS

"International Application Serial No. PCT/US2013/067043, Written Opinion dated Feb. 25, 2014", 6 pgs.
"International Application Serial No. PCT/US2013/067306, International Preliminary Report on Patentability dated May 14, 2015", 9 pgs.
"International Application Serial No. PCT/US2013/067306, International Search Report dated Jan. 17, 2014", 3 pgs.
"International Application Serial No. PCT/US2013/067306, Written Opinion dated Jan. 17, 2014", 7 pgs.
"International Application Serial No. PCT/US2013/067317, International Preliminary Report on Patentability dated May 14, 2015", 9 pgs.
"International Application Serial No. PCT/US2013/067317, International Search Report dated Feb. 7, 2014", 3 pgs.
"International Application Serial No. PCT/US2013/067317, Written Opinion dated Feb. 7, 2014", 7 pgs.
"International Application Serial No. PCT/US2013/067522, International Preliminary Report on Patentability dated May 14, 2015", 8 pgs.
"International Application Serial No. PCT/US2013/067522, International Search Report dated Feb. 12, 2014", 3 pgs.
"International Application Serial No. PCT/US2013/067522, Written Opinion dated Feb. 12, 2014", 6 pgs.
"International Application Serial No. PCT/US2013/067575, International Preliminary Report on Patentability dated May 14, 2015", 8 pgs.
"International Application Serial No. PCT/US2013/067575, International Search Report dated Feb. 21, 2014", 3 pgs.
"International Application Serial No. PCT/US2013/067575, Written Opinion dated Feb. 21, 2014", 6 pgs.
"International Application Serial No. PCT/US2013/067582, International Preliminary Report on Patentability dated May 14, 2015", 6 pgs.
"International Application Serial No. PCT/US2013/067582, International Search Report dated Nov. 27, 2013", 3 pgs.
"International Application Serial No. PCT/US2013/067582, Written Opinion dated Nov. 27, 2013", 4 pgs.
"Radio Frequency (RF) requirements for Multicarrier and Multiple Radio Access Technology (Multi-RAT) Base Station (BS)", 3GPP TR 37.900 V11.0.0. Technical Specification Group Radio Access Network. Release 11., (Sep. 24, 2012), 75 pgs.
"Relay System Simulation Results with Coverage Boosting and Control Channel Modeling", 3GPP TSG RAN WG1 Meeting #59, R1-094838, Motorola, (2009), 12 pgs.
"Telecommunication management; Self-Organizing Networks (SON); Self-healing concepts and requirements", 3GPP TS 32.541 V10.0.0. Technical Specification Group Services and System Aspects. Release 10., (Mar. 2011), 21 pgs.
"The Mobile Broadband Standard", 3GPP List of Work Items, [Online] retrieved from the internet:<http://www.3gpp.org/DynaReport/WI-List.html>.
"Title Change Request", 3GPP TSG-RAN WG2 Meeting #79bis; R2-125108, (Oct. 8, 2012), 5 pgs.
"Triggering a detached MTC device", InterDigital Communications, TD S2-110673, 3GPP TSG SA WG2 Meeting #83, (Feb. 2011), 4 pgs.
"TSG-SA5 Meeting #86 Change Request 32.766", New Orleans. S5-123194., (Nov. 12, 2012), 26 pgs.
Doppler, Klaus, et al., "Device-to-Device Communication as an Underlay to LTE-Advanced Networks", IEEE Communications Magazine, 47(12), (Dec. 2009), 42-49.
Hong, Wei, et al., "Considering In-Device Coexistence interference from WiFi point of view", IEEE 802.11-13/0880-00, (Jul. 17, 2013), 13 pgs.
Lei, Lei, et al., "Operator controlled device-to-device communications in LTE-advanced networks", IEEE Wireless Communications, 19(3), (Jun. 2012), 96-104.
"U.S. Appl. No. 14/119,228, Non Final Office Action dated Jun. 19, 2015", 6 pgs.

"U.S. Appl. No. 14/119,228, Response filed Jul. 31, 2015 to Non Final Office Action dated Jun. 19, 2015", 10 pgs.
"U.S. Appl. No. 14/124,457, Non Final Office Action dated Jul. 15, 2015", 18 pgs.
"U.S. Appl. No. 14/126,611, Notice of Allowance dated Aug. 19, 2015", 12 pgs.
"U.S. Appl. No. 14/126,611, Response filed Jul. 24, 2015 to Final Office Action dated May 22, 2015", 9 pgs.
"U.S. Appl. No. 14/126,654, Final Office Action dated Jun. 18, 2015", 36 pgs.
"U.S. Appl. No. 14/126,654, Response filed Aug. 28, 2015 to Final Office Action dated Jun. 18, 2015", 15 pgs.
"U.S. Appl. No. 14/127,092, Non Final Office Action dated Jul. 6, 2015", 28 pgs.
"U.S. Appl. No. 14/119,228, Notice of Allowance dated Sep. 29, 2015", 8 pgs.
"U.S. Appl. No. 14/124,457, Response filed Nov. 11, 2015 to Non Final Office Action dated Jul. 15, 2015", 11 pgs.
"U.S. Appl. No. 14/124,939, Non Final Office Action dated Oct. 29, 2015", 31 pgs.
"U.S. Appl. No. 14/125,472, Non Final Office Action dated Jan. 22, 2016", 8 pgs.
"U.S. Appl. No. 14/125,472, Non Final Office Action dated Oct. 29, 2015", 11 pgs.
"U.S. Appl. No. 14/125,767, Notice of Allowance dated Dec. 24, 2015", 15 pgs.
"U.S. Appl. No. 14/126,654, Notice of Allowance dated Sep. 29, 2015", 21 pgs.
"U.S. Appl. No. 14/126,998, Non Final Office Action dated Sep. 25, 2015", 24 pgs.
"U.S. Appl. No. 14/127,092, Examiner Interview Summary dated Oct. 9, 2015", 3 pgs.
"U.S. Appl. No. 14/127,092, Final Office Action dated Jan. 6, 2016", 25 pgs.
"U.S. Appl. No. 14/127,092, Response Non Final Office Action dated Jul. 6, 2015", 11 pgs.
"U.S. Appl. No. 14/127,621, Non Final Office Action dated Jan. 14, 2016", 19 pgs.
"U.S. Appl. No. 15/013,658, Preliminary Amendment dated Feb. 3, 2016", 9 pgs.
"Chinese Application Serial No. 201380051478.0, Preliminary Amendment dated Oct. 20, 2015", W/ English Claims, 18 pgs.
"Chinese Application Serial No. 201380051528.5, Voluntary Amendment dated Dec. 9, 2015", not in English, 13 pgs.
"Chinese Application Serial No. 201380051575.X, Voluntary Amendment dated Dec. 21, 2015", not in English, 13 pgs.
"Japanese Application Serial No. 2015-534837, Office Action dated Jan. 19, 2016", w/ English Translation, 5 pgs.
"3rd Generation Partnership Project; Technical Specification Group Radio Access Network; Evolved Universal Terrestrial Radio Access (E-UTRA); Study on signalling and procedure for interference avoidance for in-device coexistence (Release 11)", 3GPP Standard; 3GPP TR 36.816, 3rd Generation Partnership Project (3GPP), Mobile Competence Centre; 650, Route Des Lucioles; F-06921 Sophia-Antipolis Cedex; France, vol. RAN WG2, No. V11.2.0,, (Dec. 22, 2011), 1-44.
"3rd Generation Partnership Project;Technical Specification Group Radio Access Network;Further Advancements for E-UTRAPhysical Layer Aspects(Release 9)", 3GPP Draft; TR 36.814_200, 3rd Generation Partnership Project (3GPP), Mobile Competence Centre ; 650, Route Des Lucioles ; F-06921 Sophia-Antipolis Cedex; France, vol . RAN WG1 , no. San Francisco, USA; 20100222, (Apr. 8, 2010).
"Aperiodic CSI Feedback for Rel-11 CoMP", 3GPP Draft; RI-123365 Aperiodic CSI Feedback for REL-11 Comp, 3rd Generation Partnership Project, vol. RAN WG, Retrieved from the Internet: <URL:http://www.3gpp.org/ftp/tsg_ran/WGI_RL1/TSGR1_70/Docs/>, (Aug. 5, 2012).
"U.S. Appl. No. 14/124,457, Notice of Allowance dated Feb. 8, 2016", 9 pgs.
"U.S. Appl. No. 14/124,939, Final Office Action dated Jun. 17, 2016", 30 pgs.

(56) References Cited

OTHER PUBLICATIONS

"U.S. Appl. No. 14/124,939, Response filed Feb. 29, 2016 to Non Final Office Action dated Oct. 29, 2015", 15 pgs.
"U.S. Appl. No. 14/124,964, Non Final Office Action dated Apr. 8, 2016", 14 pgs.
"U.S. Appl. No. 14/124,964, Respnse filed Jul. 8, 2016 to Non Final Office Action dated Apr. 8, 2016", 13 pgs.
"U.S. Appl. No. 14/125,472, Non Final Office Action dated Jun. 9, 2016", 10 pgs.
"U.S. Appl. No. 14/125,472, Response filed Apr. 22, 2016 to Non Final Office Action dated Jan. 22, 2016", 12 pgs.
"U.S. Appl. No. 14/125,767, 312 Amendment filed Jan. 22, 2016", 10 pgs.
"U.S. Appl. No. 14/125,767, PTO Response to 312 Amendment dated Feb. 9, 2016", 2 pgs.
"U.S. Appl. No. 14/126,998, Final Office Action dated May 12, 2016", 24 pgs.
"U.S. Appl. No. 14/126,998, Response filed Feb. 23, 2016 to Non Final Office Action dated Sep. 25, 2015", 11 pgs.
"U.S. Appl. No. 14/127,015, Non Final Office Action dated Jul. 18, 2016", 8 pgs.
"U.S. Appl. No. 14/127,015, Response filed Jun. 24, 2016 to Restriction Requirement dated Apr. 26, 2016", 8 pgs.
"U.S. Appl. No. 14/127,015, Restriction Requirement dated Apr. 26, 2016", 10 pgs.
"U.S. Appl. No. 14/127,092, Notice of Allowance dated Apr. 13, 2016", 16 pgs.
"U.S. Appl. No. 14/127,092, Response filed Mar. 7, 2016 to Final Office Action dated Jan. 6, 2016", 14 pgs.
"U.S. Appl. No. 14/127,621, Final Office Action dated May 26, 2016", 25 pgs.
"U.S. Appl. No. 14/127,621, Non Final Office Action dated Sep. 2, 2016", 22 pgs.
"U.S. Appl. No. 14/127,621, Response filed Aug. 23, 2016 to Final Office Action dated May 26, 2016", 9 pgs.
"U.S. Appl. No. 14/990,239, Non Final Office Action dated Aug. 12, 2016", 9 pgs.
"U.S. Appl. No. 15/013,658, Non Final Office Action dated May 20, 2016", 50 pgs.
"U.S. Appl. No. 15/013,658, Response filed Aug. 12, 2016 to Non Final Office Action dated May 20, 2016", 16 pgs.
"U.S. Appl. No. 14/127621, Response filed Aug. 14, 2016 to Non Final Office Action dated Jan. 14, 2016", 12 pgs.
"CSI Collision Handling for CoMP", R1-123468, 3GPP TSG RAN WG1, (2012), 3 pgs.
"Device Trigger Information", 3gpp Draft; S2-120650, 3rd Generation Partnership Project (3GPP), Mobile Competence Centre ; 650, Route Des Lucioles ; F-06921 Sophia-Antipolis Cedex ; France, vol. Sa Wg2, No. Vancouver, (Jan. 31, 2012).
"European Application Serial No. 13850277.8, Extended European Search Report dated Aug. 2, 2016", 8 pgs.
"European Application Serial No. 13850323.0, Extended European Search Report dated Jul. 14, 2016", 12 pgs.
"European Application Serial No. 13850951.8, Extended European Search Report dated May 25, 2016", 9 pgs.
"European Application Serial No. 13851603.4, Extended European Search Report dated Jul. 14, 2016", 11 pgs.
"European Application Serial No. 13851994.7, Extended European Search Report dated Jun. 28, 2016", 10 pgs.
"European Application Serial No. 13851996.2, Extended European Search Report dated Jul. 18, 2016", 15 pgs.
"European Application Serial No. 16163446.4, Extended European Search Report dated Jul. 20, 2016", 11 pgs.
"Introduction of Rel-11 features", 3GPP Draft; RI-124012-36.213 CR0389 (REL-11, B) Introduction of REL-11 Features, 3rd Generation Partnership Project (3GPP), Retrieved from the Internet: <URL:http://www.3gpp.org/ftp/tsg_ran/WGI_RL1/TSGR1_70/ Docs/>, (Sep. 19, 2012).
"Japanese Application Serial No. 2015-534837, Response filed Apr. 14, 2016 to Office Action dated Jan. 19, 2016", 21 pgs.

"Korean Application Serial No. 2015-7008322, Office Action dated Jul. 22, 2016", With English Translation, 15 pgs.
"Maximum number of CSI processes", 36PP Draft; RI-124290, 3rd Generation Partnership Project (36PP), Mobile Competence Centre,NEC Group, Retrieved from the Internet<URL:http://www. 3gpp.org/ftp/tsg_ran/WGI_RLI/TSGRI_70b/Docs>, (Sep. 29, 2012).
"MTC small data Identification mechanism for non-SMS Small Data Transmission Solution", 3gpp Draft; S2-114341_MTC_ Small_Data_Identification, 3rd Generation Partnership Project (3GPP), Mobile Competence Centre ; 650, Route Des Lucioles ; F-06921 Sophia-Antipolis Cedex ; France, (Oct. 4, 2011).
"Periodic CSI Feedback for Rel-11 CoMP", NTT DOCOMO, 3GPP Draft; RI-123364 Periodic CSI Feedback for REL-11 Comp, 3rd Generation Partnership Project (3GPP), Mobile Competence Centre, Retrieved from the Internet: <URL:http://www.3gpp.org/ftp/ tsg_ran/WGI RL1/TSGR1_70/Docs/>, (Aug. 5, 2012).
"Relay System Simulation Results with Coverage Boosting and Control Channel Modeling", 3GPP Draft: RI-094838—Relay SYS-SIM Results W Coverage Boosting and CCH Modeling—. 3rd Generation Partnership Project (3GPP), Mobile Competence Centre ; 650, Route Des Lucioles ; F-06921 Sophia-Antipolis Cedex ; France (Nov. 4, 2009).
"Remaining details of periodic CSI reporting", 3GPP Draft; RI-124723 Remaining Details of Periodic CSI Reporting, 3rd Generation Partnership Project (3GPP), Retrieved from the Internet: <URL:http://www.3gpp.org/ftp/tsg_ran/WGI_RLI/TSGRI_71/ Docs>, (Nov. 2, 2012).
"Remaining Signaling Issues for the IDC operation". 3GPP Draft; R2-124472-Signaling, 3rd Generation Partnership Project (3GPP), Mobile Competence Centre ; 650, Route Des Lucioles ; F-06921 vol. RAN WG2, no. Bratislava. Slovakia; 20121008-20121012, [Online] retrieved from the internet:http://www.3gpp.org/ftp/tsg_ ran/WG2_RL2/TSGR2_79bis/Docs/, (Sep. 28, 2012).
"Triggering procedure over Tsp", 3gpp Draft; S2-120558_Tsp_ Trigger_Proc, 3rd Generation Partnership Project (3GPP), Mobile Competence Centre 650, Route Des Lucioles ; F-06921 Sophia-Antipolis Cedex France, vol. Sa Wg2, No. Vancouver, (Jan. 31, 2012).
"Update HSS based device trigger solution", 3GPP TSG SA WG2 Meeting #86: TD S2-113082, (Jul. 15, 2011), 5 pgs.
Huawei, et al., "Bandwidth reduction for low cost MTC UE and text proposal", 3GPP Draft; RI-120051, 3rd Generation Partnership Project (3GPP), Mobile Competence Centre ; 650, Route Des Lucioles ; F-06921 Sophia-Antipolis Cedex ; France,vol. RAN WG1, no. Dresden, Germany; 20120206-20120210, XP050562638, (Jan. 31, 2012).
Huawei, et al., "Periodic CSI feedback collision handling for CoMP", 3GPP Draft; RI-123104, 3rd Generation Partnership Project (3GPP), Mobile Competence Centre, Retrieved from the Internet: <URL:http://www.3gpp.org/ftp/tsg_ran/WGI_RL1/TSGR1_ 70/Docs/>, (Aug. 5, 2012), 7 pgs.
Kanzaki, Mitsuru, "Three-legged Ladder", Japanese Laid-open Utility Model Publication No. 7-32198, (Jun. 16, 1995), 21 pgs.
Nishina, Koichi, et al., "Stepladder", Japanese Laid-open Utility Model Publication No. 62-52700, (Apr. 1, 1987), 8 pgs.
Suzuki, Masaaki, et al,, "Three-Leg Type Ladder", Patent Abstracts of Japan 09-112165, (Apr. 28, 1997), 8 pgs.
"U.S. Appl. No. 14/124,939, Advisory Action dated Oct. 26, 2016", 5 pgs.
"U.S. Appl. No. 14/124,939, Non Final Office Action dated Dec. 19, 2016", 37 pgs.
"U.S. Appl. No. 14/124,939, Response filed Mar. 20, 2017 to Non Final Office Action dated Dec. 19, 2016", 14 pgs.
"U.S. Appl. No. 14/124,939, Response filed Oct. 17, 2016 to Final Office Action dated Jun. 17, 2016", 10 pgs.
"U.S. Appl. No. 14/124,964, Notice of Allowance dated Oct. 19, 2016", 15 pgs.
"U.S. Appl. No. 14/125,472, Notice of Allowability dated Jan. 23, 2017", 2 pgs.
"U.S. Appl. No. 14/125,472, Notice of Allowance dated Nov. 8, 2016", 5 pgs.

(56) References Cited

OTHER PUBLICATIONS

"U.S. Appl. No. 14/125,472, Response filed Sep. 9, 2016 to Non Final Office Action dated Jun. 9, 2016", 11 pgs.
"U.S. Appl. No. 14/126,998, Non Final Office Action dated Nov. 28, 2016", 27 pgs.
"U.S. Appl. No. 14/126,998, Response filed Mar. 28, 2017 to Non Final Office Action dated Nov. 28, 2016", 9 pgs.
"U.S. Appl. No. 14/126,998, Response filed Oct. 11, 2016 to Final Office Action dated May 12, 2016", 8 pgs.
"U.S. Appl. No. 14/127,015, Advisory Action dated Mar. 28, 2017", 3 pgs.
"U.S. Appl. No. 14/127,015, Final Office Action dated Dec. 13, 2016", 9 pgs.
"U.S. Appl. No. 14/127,015, Non Final Office Action dated May 8, 2017", 11 pgs.
"U.S. Appl. No. 14/127,015, Response filed Mar. 13, 2017 to Final Office Action dated Dec. 13, 2016", 12 pgs.
"U.S. Appl. No. 14/127,015, Response filed Oct. 18, 2016 to Non Final Office Action dated Jul. 18, 2016", 9 pgs.
"U.S. Appl. No. 14/127,621, Final Office Action dated Mar. 7, 2017", 30 pgs.
"U.S. Appl. No. 14/127,621, Response filed May 8, 2017 to Final Office Action dated Mar. 7, 2017", 10 pgs.
"U.S. Appl. No. 14/127,621, Response filed Dec. 1, 2016 to Non Final Office Action dated Sep. 2, 2016", 11 pgs.
"U.S. Appl. No. 14/990,239, Corrected Notice of Allowance dated Oct. 26, 2016", 2 pgs.
"U.S. Appl. No. 14/990,239, Notice of Allowance dated Oct. 5, 2016", 7 pgs.
"U.S. Appl. No. 14/990,239, Response filed Sep. 9, 2016 to Non Final Office Action dated Aug. 12, 2016", 11 pgs.
"U.S. Appl. No. 15/013,658, Final Office Action dated Oct. 21, 2016", 43 pgs.
"U.S. Appl. No. 15/013,658, Notice of Allowance dated Jan. 26, 2017", 7 pgs.
"U.S. Appl. No. 15/013,658, Response filed Dec. 21, 2016 to Final Office Action dated Oct. 21, 2016", 14 pgs.
"European Application Serial No. 13850277.8, Response filed Feb. 28, 2017 to Extended European Search Report dated Aug. 2, 2016", 10 pgs.
"European Application Serial No. 13850951.8, Communication pursuant to Article 94(3) EPC dated Apr. 10, 2017", 5 pgs.
"European Application Serial No. 13850951.8, Response filed Dec. 12, 2016 to Extended European Search Report dated May 25, 2016", 10 pgs.
"European Application Serial No. 13851603.4, Response filed Feb. 13, 2017 to Extended European Search Report dated Jul. 14, 2016", 15 pgs.
"European Application Serial No. 13851994.7, Response filed Jan. 11, 2017 to Extended European Search Report dated Jun. 28, 2016", 13 pgs.
"European Application Serial No. 13851996.2, Response filed Feb. 13, 2017 to Extended European Search Report dated Jul. 18, 2016", 8 pgs.
"European Application Serial No. 13851996.2, Response filed Apr. 4, 2017 to Extended European Search Report dated Jul. 18, 2016", 7 pgs.
"European Application Serial No. 16163446.4, Response filed Feb. 23, 2017 to Office Action dated Aug. 29, 2016", 17 pgs.
"Korean Application Serial No. 2015-7008322, Response filed Sep. 22, 2016 to Office Action dated Jul. 22, 2016", W/ English Translation of Claims, 33 pgs.
"U.S. Appl. No. 14/124,939, Final Office Action dated Jun. 23, 2017", 37 pgs.
"U.S. Appl. No. 14/126,998, Final Office Action dated Jun. 22, 2017", 30 pgs.
"U.S. Appl. No. 14/127,621, Advisory Action dated May 30, 2017", 2 pgs.
"Chinese Application Serial No. 201380051575.X, Office Action dated Apr. 1, 2017", w/ English Translation, 28 pgs.

* cited by examiner

PCI PARTITION AND ALLOCATION FOR CELLULAR NETWORK

RELATED APPLICATION

This patent application is a U.S. National Stage Filing under 35 U.S.C. 371 from International Patent Application Serial Number PCT/US2013/067575, filed on Oct. 30, 2013, published on May 8, 2014 as WO/2014/070929 A1, which claims the benefit of priority, to U.S. Provisional Application Ser. No. 61/721,436, filed Nov. 1, 2012, all of which are incorporated herein by reference in their entirety.

TECHNICAL FIELD

Examples generally relate to Physical Cell Identity (PCI) and more specifically to avoiding collision or confusion between User Equipment (UE) or base stations in a cellular network (e.g., a Long Term Evolution (LTE) network).

TECHNICAL BACKGROUND

PCI can help UEs distinguish different cells from each other by distinguishing different transmitters. In LTE, each cell is assigned a PCI upon deployment. The range of PCI is currently from 0-503. Assigning PCI to a large number of cells can create a problem because no two cells in range of a UE should be assigned the same PCI. If a UE receives communications from two cells with the same PCI, a PCI confusion or PCI collision can occur. These confusions or collisions can render the UE unable to identify the cell correctly. The number of small cells (e.g., micro, pico, or femto cells) is expected to increase in the future, thus exacerbating the problem.

A collision can occur when a UE is within range of two cells that each has the same PCI assigned and are simultaneously broadcasting to the UE. A confusion can occur when the UE is within range of two cells that each have the same PCI and the UE cannot distinguish between the two cells. Thus, to avoid or reduce the number of collisions a PCI should be unique in the area that a given cell covers, and to avoid or reduce the number of confusions a cell should not have neighbor cells with identical PCIs. Confusion can cause handover procedures from one cell to another cell to fail.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Examples in this disclosure relate to apparatuses and systems that include collision or confusion avoidance in a cellular network (e.g., an LTE network). Examples also relate to techniques of using and implementing the collision or confusion avoidance mechanisms.

The following description includes terms, such as first, second, etc. that are used for descriptive purposes only and are not to be construed as limiting. The examples of an apparatus or article described herein can be manufactured, used, or shipped in a number of positions and orientations.

Allocating PCI with only 504 unique PCI identifiers in a cell without a collision occurring can be challenging. With the number of small cells expected to be deployed in future generations of cellular networks (e.g., LTE Rel-12 and beyond) increasing, allocating PCI with only 504 unique PCI identifiers in a cell without a collision occurring can be challenging.

Figure 1:
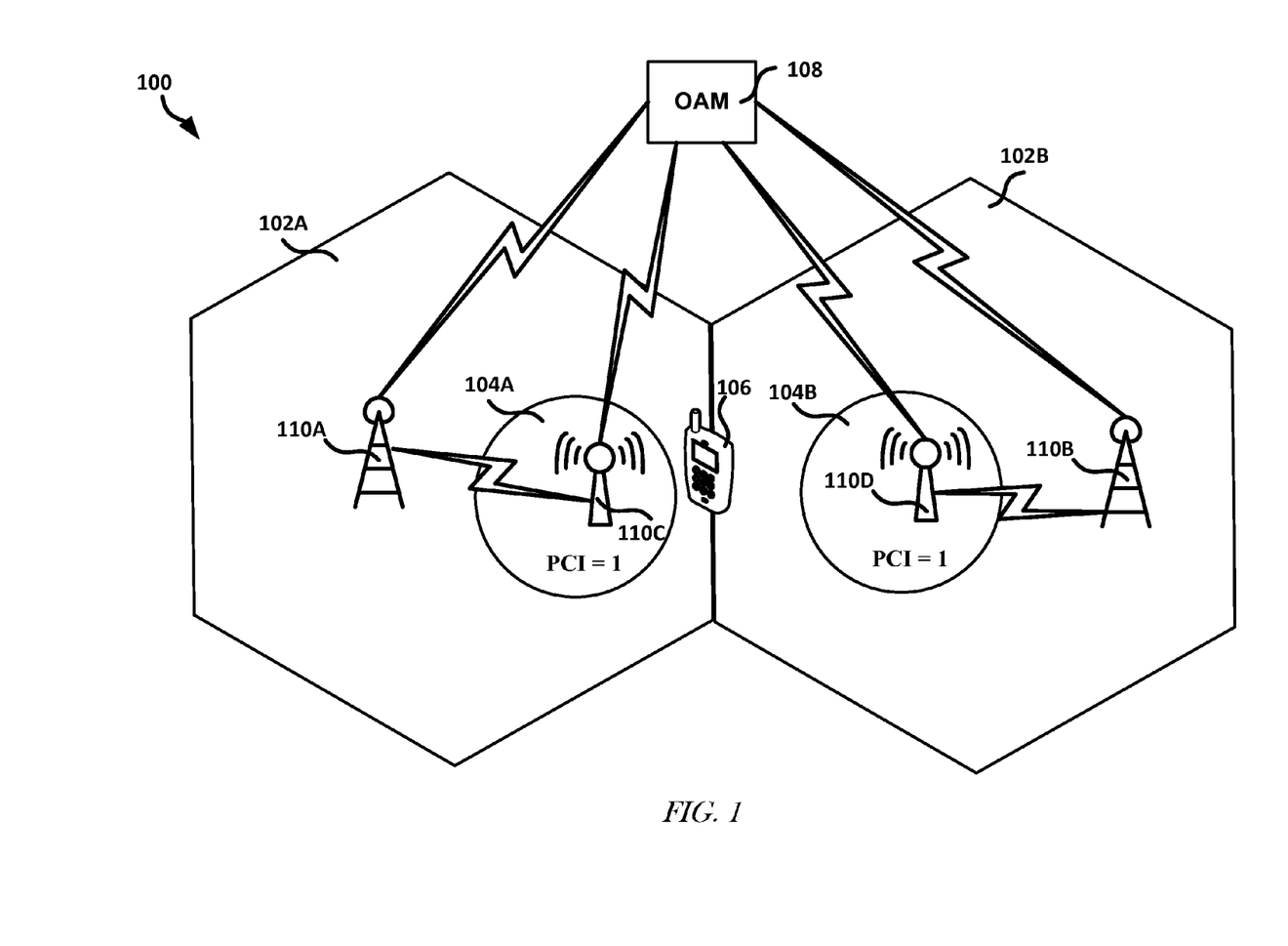
FIG. 1 illustrates an example of a Heterogeneous cellular Network (HetNet).

FIG. 1 shows an example of how a collision can occur. In the example of FIG. 1, a HetNet 100 can include two large cells 102A and 102B (e.g., macro cells or Primary cells (Pcells)), with each large cell 102A and 102B including a respective small cell 104A and 104B (e.g., micro cells, pico cells, or femto cells, or Secondary cells (Scells)). Each of the large cells 102A and 102B and small cells 104A and 104B can include a respective base station 110A, 110B, 110C, and 110D (e.g., enhanced Node B (eNodeB)). The HetNet 100 can include an Operations, Administration, and Maintenance device 108 communicatively coupled to the base stations 110A-110D. The small cells 104A or 104B can be communicatively coupled to the OAM 108 through the nearest, respective large cell 102A and 102B, such as to communicate to the OAM 108 by transmitting a communication from a base station 110C or 110D to a base station 110A or 110B, respectively, which can forward the communication to the OAM 108.

The small cells 104A and 104B are physically close to each other and each has the same PCI code of "1" in this example. The UE 106 situated between the two small cells 104A may not be able to distinguish between the two small cells 104A and 104B if it is within range of both small cells 104A and 104B simultaneously, because they have the same PCI. This is what is known as PCI collision.

As used herein, "large cell" refers to what is commonly known as a macro cell. Macrocells can have a transmission area of between about 1 kilometers and 30 kilometers, or even larger. As compared to "small cells", large cells require more electric power to operate. As used herein, "small cell" refers to what are commonly known as microcells, picocells, and femtocells, or cells that are not considered "large cells" because of their transmission area or power requirements. A microcell can have a transmission area of between about 200 meters and 2 kilometers, a picocell can have a transmission area of between about 4 and 200 meters, and a femtocell can have a transmission area even smaller than that of a picocell. The large cell can provide the main coverage area of the cellular network and the small cell can complement the coverage area, such as to extend the coverage area or provide hot spots with relatively good cellular network connectivity and bandwidth in their transmission area. Thus, a small cell can reside within the large cell and can serve an area that is substantially smaller than the area served by the large cell.

In the current Third Generation Partnership Project (3GPP) specification, there are two PCI selection mechanisms: 1) centralized PCI assignment and 2) distributed PCI assignment. In centralized PCI assignment, the OAM device 108 signals a specific PCI value and a base station 110 (note that 110 as used herein, refers to base stations generally) can assign this value to the given cell. In distributed PCI assignment, the OAM device 108 signals a list of PCI values and the base station 110 can restrict this list by removing PCIs that are or have been reported by a UE 106 or are or have been reported by as used by a neighboring base station 110, such as over an x2 interface. Then the base station 110 can select a PCI value for the cell (e.g., randomly) from the remaining list of PCIs.

This disclosure proposes a number of PCI partitioning and allocation schemes that can reduce collisions or confusions. Available PCI codes can be split into N groups, such as an integer number of equal or unequal size groups. For example, assume there are 504 codes available for allocation to small cells 104 (note that 104 as used herein refers to small cells generally) in a given large cell transmission area. In a partition of N=4 groups, the 504 codes, {0-503}, can be split into group 1={0-150}; group 2={151-303}, group 3={304-403}; and group 4={404-503}. When a small cell 104 is deployed, the PCI assignment can be based on (e.g., a function of) a Reference Signal Received Power (RSRP) measured at a small cell 104 base station 110. The reference signal can be sent from a large cell 102. Note that "102" as used herein refers to large cells generally. As used herein "when" can mean "at or around the time", "after", or "in response to" as is appropriate for the context of usage.

A large cell 102 can include an RSRP map (e.g., a map that depicts generally the different areas of the large cell 102 transmission area that include relatively weak, and relatively strong, etc. RSRP). An OAM device 108 can be responsible for dictating the partitioning of the PCI codes relative to the RSRP map. Each partition of the PCI codes can map to a region on the RSRP map. When a small cell 104 is deployed, the map can be used to help determine the PCI code assignment. A PCI code can be picked at random for assignment or a fixed assignment protocol can be used (e.g., the PCI codes can be assigned in a predetermined order, such as alphabetical, numerical, alpha-numeric, or other order). A Global Positioning System (GPS) can help verify that the small cell 104 is in a particular location. Alternatively, the GPS can be used to determine the location of the deployed small cell 104, instead of using the RSRP value measured at the small cell 104 base station 110.

Figure 2:
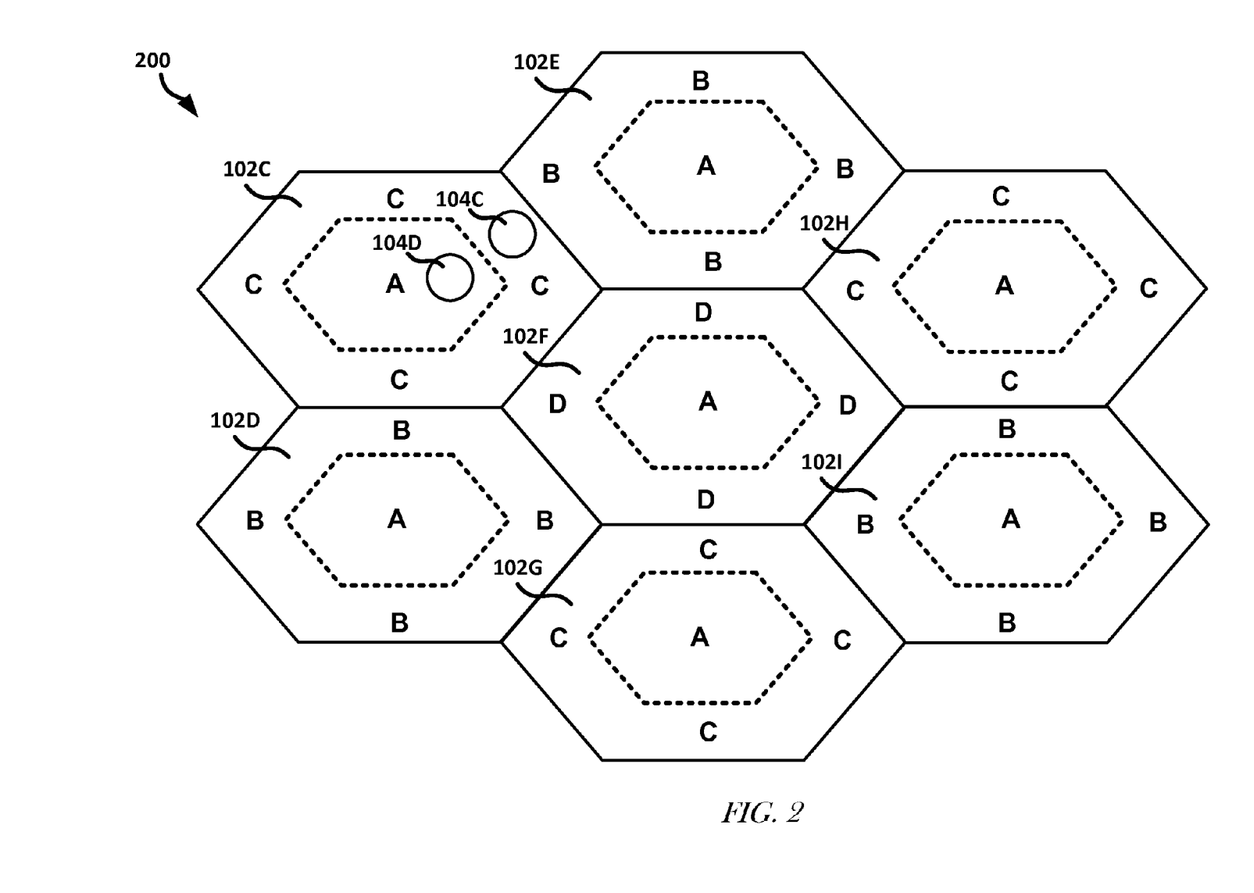
FIG. 2 illustrates an example of a partitioned HetNet that is configured to reduce collisions or confusions.

FIG. 2 shows an example of a network 200 that can include a number of large cells 102C, 102D, 102E, 102F, 102G, 102H, and 102I, some of which are contiguous with one another. In this example, all large cells 102C-102I have a region "A" (the region of the large cell 102C-102I that extends from the center of the respective large cell 102C-102I to the dotted line in the respective large cell 102C-102I). It is assumed, for simplicity, that a base station 110 (see FIG. 1) is positioned at the center of each large cell 102. Region "A" can correspond to a region in which a small cell 104 deployed therein is likely to measure an RSRP that is relatively high (e.g., an RSRP signal that is greater than one or more specified thresholds). This can be due to the base station 110 being relatively close to the small cell 104 when the small cell 104 is deployed in region "A". Note that small cell 104D is deployed in region "A" of large cell 102C.

The small cells 104 located in the outer region, the region from the respective dotted line to the respective outer edge of the large cell 102 (e.g., region "B" of large cell 102D, 102E, and 102I; region "C" of large cell 102C, 102G, and 102H; and region "D" of large cell 102F) are likely to measure a relatively low RSRP (e.g., an RSRP that is less than or equal to a specified threshold or generally less than an RSRP measurement made from a base station 110 deployed in a region "A"). Note that small cell 104C is located in the outer region "C" of large cell 102C. A small cell 104 located in these large cells 102C-102I can be assigned, for example, a PCI code from the code group "1" if they are determined to reside in region "A", a PCI code from the code group "2" if they are determined to reside in region "B", group "3" if they are determined to reside in region "C", group "4" if they are determined to reside in region "D". In the example of FIG. 2, no two neighboring large cell 102C-102I regions (e.g., edges) are allocated the same group of PCI codes. The PCI allocation in this example can be relatively collision free, such as if the PCI codes are only used once.

Other configurations can be used in other examples. For example, each cell can be partitioned into fewer or more regions. The fewer or more regions can each correspond to specific ranges of RSRP values received at the base station 110, specific GPS coordinates received, or a combination thereof. It can be advantageous to configure two neighboring regions to be disjoint (e.g., non-overlapping) or be allocated PCI groups that are disjoint (e.g., do not overlap or contain a same element). Using such a configuration can help reduce collisions or confusions experienced by a UE 106.

The allocation or assignment of PCI codes can be geographically based, such as by using GPS coordinates to allocate or assign PCI codes based on geographic location. A combination of GPS coordinates corresponding to a location of a small cell 104 and RSRP received at the base station can be used to allocate to a small cell 104 a PCI code from a specific group of PCI codes.

In one or more embodiments, a base station 110 (e.g., a large cell eNodeB or a small cell eNodeB) or OAM 108 can determine if the RSRP value is greater than a specified threshold. In response to determining the RSRP is greater than the threshold, the base station 110 or OAM 108 can choose a PCI code (e.g., randomly or otherwise) from a group of available PCI codes and the base station 110 or OAM 108 can assign a specific PCI code to the deployed small cell 104 base station 110.

In the example of FIG. 2, after, or during, small cell 104 deployment and in response to determining the RSRP is greater than a specified threshold, the base station 110 or OAM 108 can determine that the small cell 104 is in region "A" (i.e. the region from the center of the large cell 102C, 102D, 102E, 102F, 102G, 102H, or 102I to the dotted line within the respective cell) and can assign a PCI code from a predetermined set of PCI codes allocated for that region to the small cell 104. In the example of FIG. 2, all regions labeled "A" can have small cells 104 with PCI codes allocated from the same group of PCI codes. That is, for example, region "A" of large cell 102C can include small cells allocated with a PCI code from group "1", region "A" of large cell 102B can include small cells allocated with PCI codes from group "1", and so on.

If the received RSRP measurement is less than the specified threshold, the respective large cell 102C-102I can assign a PCI value from a different group of PCI codes that corresponds to a region further from the center of the cell or outside of region "A". In FIG. 2 each of these regions is labeled "B", "C", and "D". These regions each extend from the dotted line to the periphery of their respective large cell 102C-102I. Note that RSRP can be used to accomplish this assignment because the RSRP generally decreases as the reference signal received traverses a further distance, which generally corresponds to the cell being further from the base station.

By allocating different PCI code groups to the outer regions (e.g., "B", "C", and "D") and configuring adjacent outer regions to include different PCI code groups (e.g., in FIG. 2, region "B" is not contiguous with any other region "B", region "C" is not contiguous with any other region "C", and region "D" is not contiguous with any other region "D"), the likelihood of having a collision or confusion at a UE can be reduced. The likelihood can be further reduced by having a minimum distance between two regions that are allocated the same PCI code group. In the example of FIG. 2, the minimum distance between like PCI code groups is a large cell edge length.

In one or more embodiments, if a small cell 104 is determined to be within the region "A" of large cell 102C, 102G, or 102H, a PCI code from the group including PCI codes from groups "1", "2", and "4" can be selected and assigned to the small cell base station. In these embodiments, group "3" can be assigned to small cells 104 deployed in the outer region "C" of the large cells 102C, 102G, and 102H. Similar PCI group allocations and assignments can be made in the other large cells 102D, 102E, 102F, and 102I. If a small cell 104 is determined to be within the region "A" of large cell 102D, 102E, or 102I, a PCI code from the group including PCI codes from groups "1", "3", and "4" can be selected and assigned to the small cell 104 base station 110. In these embodiments, group "2" can be assigned to small cells 104 deployed in the outer region "B" of the large cells 102D, 102E, and 102I. If a small cell 104 is determined to be within the region "A" of large cell 102F a PCI code from the group including PCI codes from groups "1", "2", and "3" can be selected and assigned to the small cell 104 base station 110. In these embodiments, group "4" can be assigned to small cells 104 deployed in the outer region "D" of the large cell 102F.

Since no two neighboring (e.g., contiguous or adjacent) large cells 102, of the example shown in FIG. 2, have the same group of available PCI codes assigned to outer regions thereof, the system can be relatively or completely collision and confusion free, such as in an ideal case (e.g., where there are no large cells that are reusing PCI codes because there are too many small cells deployed therein).

When the group of available PCI codes has become the empty set, previously assigned PCI codes may be used again. In such cases, a collision or confusion may occur. By mapping where each PCI code is assigned, such as in the OAM 108 or a base station 110, a repeat PCI code can be intelligently selected so as to reduce the risk of collision or confusion. One such technique of assigning a repeat PCI code is to assign a PCI code previously assigned to a small cell 104 that is outside the transmission area or a small cell 104 that is a minimum distance away from the small cell that is being deployed.

There could be several approaches to allocating a PCI code to a small cell 104. The approach can vary depending on which entity determines the PCI code for the small cell 104.

If a large cell 102 base station 110 assigns the PCI code to the small cell 104 base station 110, then the following techniques can be used. After the small cell 104 powers on, it can operate as if it is a normal UE. The small cell 104 base station 110 can attach to a nearby large cell 102 (e.g., the closest large cell 102). In one or more embodiments, a relay can be used. The small cell 104 base station 110 can indicate to the large cell 102 base station 110 that it is the small cell 104 base station 110.

The small cell 104 base station 110 can measure an RSRP of a reference signal received from the large cell 102. RSRP can be determined based on a single received reference signal, an average of a plurality of received reference signals, or other method of determining RSRP. Measuring the RSRP can be done in a way so as to account for an anomaly in the received reference signal. The small cell 104 base station 110 can send a measurement report including RSRP of the reference signal(s). If possible, the small cell 104 base station 110 can also send the measurement report including RSRP of the neighboring small cells 104.

The large cell 102 can use the RSRP map and determine the PCI group based on the RSRP value received from the small cell 104. The large cell 102 can send the PCI code (e.g., randomly chosen from the group) to the small cell 104. Alternatively, the large cell 102 can send a list of available PCI codes to the small cell 104. The small cell 104 base station 110 can choose one of the PCI codes (e.g., randomly). The small cell 104 can indicate to the large cell 102 which PCI code was chosen. The large cell 102 can mark the PCI as used. The large cell 102 can relay to the OAM 108 which PCI code was used. The PCI code that was chosen may not be used again until all the PCI codes in the respective group have been used. The small cell 104 base station 110 can reconfigure and operate as a base station 110 (e.g., instead of as a UE 106) with the assigned PCI code.

If a small cell 104 base station 110 assigns the PCI code to itself, then the following techniques can be used. After the small cell 104 base station 110 powers on, it can register to OAM 108. The small cell 104 base station 110 can send its location information to the OAM 108. Alternatively, the small cell 104 can measure RSRP from multiple large cell 102 base stations 110 and determine which base station 110 is the closest or has the highest RSRP measurement.

The OAM 108 can provide a group of available PCI codes that correspond to the location information the small cell 104 has sent. The group of available PCI codes in each group can be PCI codes not yet assigned to other small cells 104. The OAM 108 can provide one or more thresholds to the small cell 104. The OAM 108 can indicate to the small cell 104 which group of available PCI codes corresponds to a respective range of locations or a respective range of RSRP measurements. For example, the OAM 108 can indicate that if the RSRP measurement is less than a first threshold, then the small cell 104 is to choose a PCI code from group "1", and if the RSRP measurement is greater than or equal to the first threshold, then the small cell is to choose a PCI code from group "3".

The small cell 104 can measure an RSRP of a reference signal from the large cell 102. Based on the measurement result, the small cell 104 can select the appropriate group of available PCI codes. If there are multiple PCIs in the selected group, the small cell 104 can choose one of them randomly. The small cell 104 can measure the RSRP when it has dual Radio Frequency (RF) capability to receive the reference signal from the large cell 102 base station 110 or when the small cell 104 base station 110 operates its own frequency carrier. If the small cell 104 base station 110 does not have the dual RF capability or the ability to operate its own frequency carrier, the small cell 104 base station 110 can select the group, and the corresponding PCI code, based on an RSRP measurement from a neighboring cell, such as from a UE 106 or base station 110 within the transmission area of the small cell 104 base station 110 that can measure the RSRP of the neighboring cell. Alternatively, the small cell 104 base station 110 can estimate the RSRP based on its location (e.g., GPS coordinates) or the location of a large cell 102 base station 110.

If an OAM device 108 assigns the PCI code to the small cell 104 base station 110, then the following techniques can be used. When the small cell 104 base station 110 powers on, the small cell 104 can send RSRP information to OAM 108. If the small cell 104 cannot measure RSRP, the small cell 104 can send its GPS location to the OAM 108. The OAM 108 can look up the small cell 104 location relative to the large cell 102 that the small cell 104 base station 110 will be communicating, either directly or indirectly, with. A group of available PCI codes can be selected from a mapping table. The OAM 108 can send a PCI code from the group of available PCI codes to small cell 104, such as a randomly selected PCI code. The OAM 108 can mark which PCI code was used, such as to help avoid another small cell 104 base station 110 being assigned the same PCI. If the small cell 104 base station 110 does not have GPS capability, an RF chain (e.g., the capability to measure RSRP), or other means of determining its location, the OAM 108 can assign an unused PCI code from any of the groups of available PCI codes. The OAM 108 can send the selected PCI code to the large cell 102 base station 110, which can forward the PCI code to the small cell 104 base station 110.

Due to imperfect beam shape, there may be some overlapping that can cause a PCI collision. In that case, the regular procedure to resolve the PCI collision in the current specification can be performed. Such resolutions can include a UE 106 reporting the collision or confusion to a base station 110 and the base station 110 assigning a different PCI code to the small cell 104 or the base station 110 forwarding the collision or confusion report to the OAM 108 and the OAM 108 assigning a different PCI code to the small cell 104.

Figure 3:
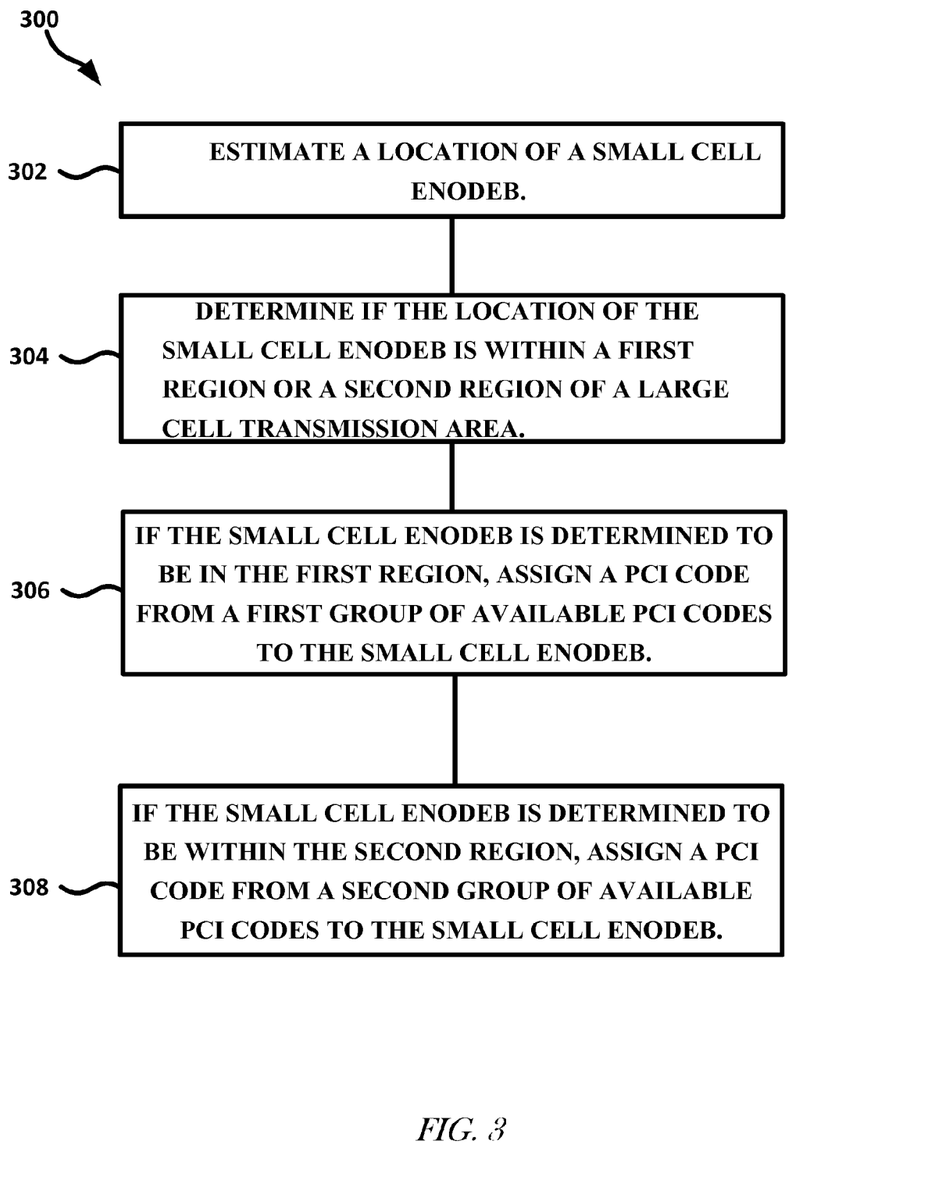
FIG. 3 illustrates an example of a technique for reducing the number of confusions or collisions experienced by a UE in a cellular network.

FIG. 3 is a block diagram of an example of a technique 300 to help reduce the number of PCI collisions or confusion in a cellular network. The method can include a PCI code to a small cell base station as a function of a location of the small cell base station. At 302, a location of a small cell base station can be estimated. The location estimation can be based on GPS coordinates of the small cell base station or an RSRP measured at the small cell base station. Estimating the location of the small cell base station can include comparing the RSRP to a first threshold. Estimating the location of the small cell base station can include comparing the RSRP to a second threshold. The second threshold can be less than the first threshold.

At 304, it can be determined if the location of the small cell base station is within a first region or a second region of a large cell transmission area. The first and second regions of the large cell transmission area can be disjoint or non-overlapping. The technique can include determining if the location of the small cell base station is within a third region of the large cell transmission area. The first, second, and third regions can be disjoint or non-overlapping. The first region can be a region of the large cell transmission area extending outward from a base station of the large cell. The second region can be a region of the large cell transmission area extending outward from an outer edge of the first region. The third region can be a region of the large cell transmission area extending outward from an outer edge of the second region.

At 306, if the small cell base station is determined to be in the first region, a PCI code from a first group of available PCI codes can be assigned to the small cell base station. The small cell base station can be determined to be within the first region if it is determined that the measured RSRP is greater than (or equal to) the first threshold. Assigning the PCI code from the first group of available PCI codes can include randomly choosing a PCI code from the first group of available PCI codes and assigning the randomly chosen PCI code to the small cell base station.

At 308, if the small cell base station is determined to be within the second region, a PCI code from a second group of available PCI codes can be assigned to the small cell base station. The first and second groups of available PCI codes can be disjoint. The small cell base station can be determined to be within the second region if it is determined that the measured RSRP is less than (or equal to) the second threshold. The small cell base station can be determined to be within the second region if it is determined that the measured RSRP is greater than (or equal to) the second threshold and less than the first threshold.

The small cell base station can be determined to be within the third region if it is determined that the RSRP is less than (or equal to) the second threshold.

The technique can include registering the small cell base station to an OAM device. The technique can include receiving the first threshold value from the OAM. The technique can include receiving the first and second sets of available PCI codes from the OAM. The technique can include indicating to the OAM device which PCI code was assigned.

Figure 4:
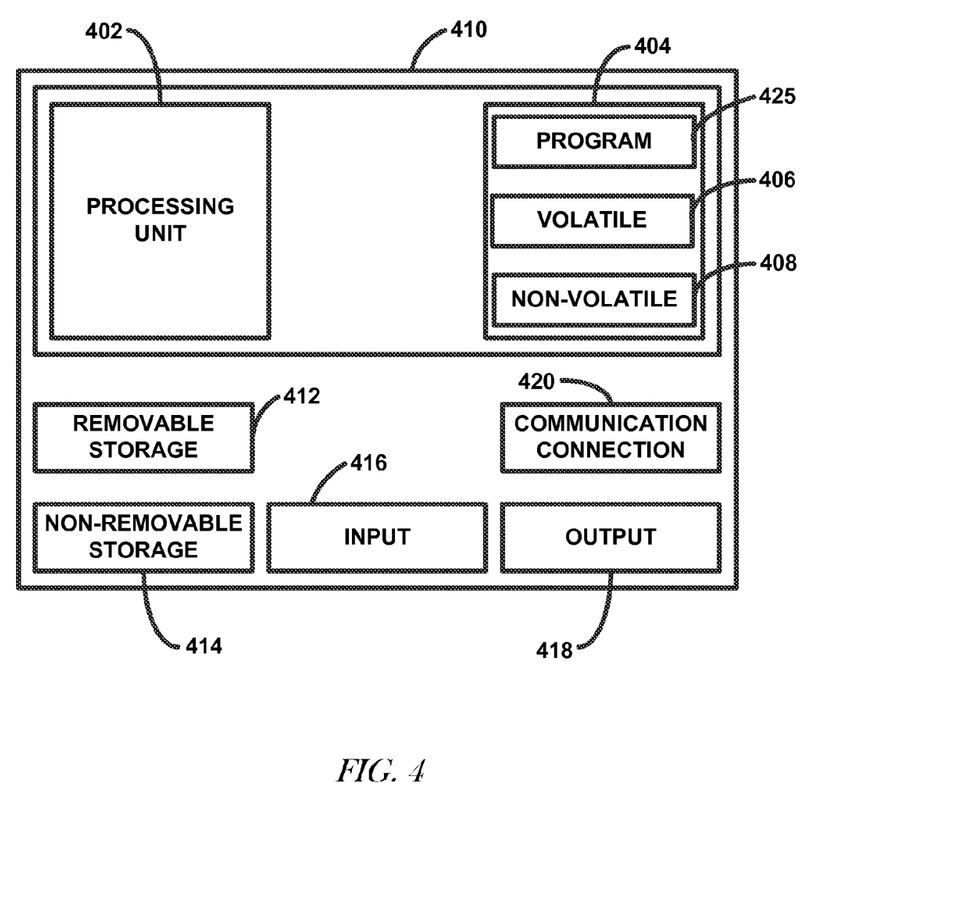
FIG. 4 is a schematic of an example of an electronic system, such as can be used in an LTE device, such as a large or small cell eNodeB, an Operations, Administration, or Maintenance (OAM) device, or a UE.

FIG. 4 is a block diagram of a computing device, according to an example embodiment. One or more of the foregoing examples of UEs 106, base stations 110, OAMs 108, or other devices that is configured to allocate or partition PCI codes, may include a computing system, such as computing system 400 of FIG. 4. In one or more embodiments, multiple such computer systems are utilized in a distributed network to implement multiple components in a transaction based environment. An object-oriented, service-oriented, or other architecture may be used to implement such functions and communicate between the multiple systems and components. One example computing device in the form of a computer 410 may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a machine-readable storage device are executable by the processing unit 402 of the computer 410. A hard drive, CD-ROM, and RAM are some examples of articles including a non-transitory computer-readable medium. For example, a computer program 425 capable of providing instructions, which when executed by the processing unit 402 or other machine capable of executing the instructions, cause the processing unit to perform allocation or assignment of PCI based on a location of a small cell, such as a small cell that is being deployed. The instructions can be saved on a CD-ROM and loaded from the CD-ROM to a hard drive of the computer 410. The computer-readable instructions can allow the computer 410 (e.g., the processing unit 402) to implement the partition or assigning algorithm.

EXAMPLES AND NOTES

The present subject matter may be described by way of several examples.

Example 1 can include or use subject matter (such as an apparatus, a method, a means for performing acts, or a device readable memory including instructions that, when performed by the device, can cause the device to perform acts), such as can include or use an LTE device configured to assign a PCI code to a small cell eNodeB based on a location of the small cell eNodeB, wherein the LTE device can be configured to: (1) estimate a location of the small cell eNodeB based on at least one of Global Positioning System (GPS) coordinates of the location of the small cell eNodeB and an RSRP measured at the small cell eNodeB, (2) determine if the location of the small cell eNodeB is within a first region or a second region of a large cell transmission area, wherein the first and second regions do not overlap, (3) in response to determining the small cell eNodeB is within the first region, assign a PCI code from a first group of available PCI codes to the small cell eNodeB; and (4) in response to determining the small cell eNodeB is within the second region, assign a PCI code from a second group of available PCI codes to the small cell eNodeB, wherein the first group of PCI codes and the second group of PCI codes are disjoint.

Example 2 can include or use, or can optionally be combined with the subject matter of Example 1, to optionally include or use wherein the device is configured to perform at least one of: (1) estimate the location of the small cell eNodeB based on the RSRP measured at the small cell eNodeB, (2) compare the RSRP to a threshold, (3) in response to determining the RSRP is less than or equal to the threshold, determining the small cell eNodeB is within the second region, and (4) in response to determining the RSRP is greater than the threshold, determining the small cell eNodeB is within the first region.

Example 3 can include or use, or can optionally be combined with the subject matter of at least one of Examples 1-2, to optionally include or use wherein the LTE device is a large cell eNodeB.

Example 4 can include or use, or can optionally be combined with the subject matter of at least one of Examples 1-2, to optionally include or use wherein the LTE device is the small cell eNodeB, and the small cell eNodeB is further configured to perform at least one of: (1) register to an Operations, Administration, and Maintenance (OAM) device, receive the threshold value from the OAM, and receive the first and second sets of available PCI codes from the OAM.

Example 5 can include or use, or can optionally be combined with the subject matter of at least one of Examples 1-2, to optionally include or use wherein the LTE device is an Operations, Administration, and Maintenance (OAM) device.

Example 6 can include or use, or can optionally be combined with the subject matter of at least one of Examples 1-5, to optionally include or use wherein the assigned PCI code is chosen randomly from the respective first and second groups of available PCI codes.

Example 7 can include or use, or can optionally be combined with the subject matter of at least one of Examples 1-6 to optionally include or use wherein the location of the small cell eNodeB is estimated base on the GPS coordinates.

Example 8 can include or use, or can be optionally be combined with the subject matter of at least one of Examples 1-7, to include subject matter (such as an apparatus, a method, a means for performing acts, or a device readable memory including instructions that, when performed by the device, can cause the device to perform acts), such as can include or use at least one of (1) estimating a location of the small cell eNodeB based on at least one of Global Positioning System (GPS) coordinates of the location of the small cell eNodeB and an RSRP measured at the small cell eNodeB, (2) determining if the location of the small cell eNodeB is within a first region or a second region of a large cell transmission area, wherein the first and second regions do not overlap, (3) in response to determining the small cell eNodeB is within the first region, assigning a PCI code from a first group of available PCI codes to the small cell eNodeB, and (4) in response to determining the small cell eNodeB is within the second region, assigning a PCI code from a second group of available PCI codes to the small cell eNodeB, wherein the first group of PCI codes and the second group of PCI codes are disjoint.

Example 9 can include or use, or can optionally be combined with the subject matter of at least one of Examples 1-8 to optionally include or use at least one of: (1) comparing the RSRP to a threshold, in response to determining the RSRP is less than or equal to the threshold, determining the small cell eNodeB is within the second region, and in response to determining the RSRP is greater than the threshold, determining the small cell eNodeB is within the first region.

Example 10 can include or use, or can optionally be combined with the subject matter of at least one of Examples 1-9 to optionally include or use at least one of: (1) registering the small cell eNodeB to an Operations, Administration, and Maintenance (OAM) device, (2) receiving the threshold value from the OAM, and (3) receiving the first and second sets of available PCI codes from the OAM.

Example 11 can include or use, or can optionally be combined with the subject matter of at least one of Examples 1-10 to optionally include or use wherein assigning the PCI code from the first group of available PCI codes includes randomly assigning the PCI code from the first group of available PCI codes.

Example 12 can include or use, or can optionally be combined with the subject matter of at least one of Examples 1-11 to optionally include or use communicating to an Operations, Administration, and Maintenance device which PCI code was assigned.

Example 13 can include or use, or can optionally be combined with the subject matter of at least one of Examples 1-12 to optionally include or use wherein the first region corresponds to a region of the large cell extending outward from an eNodeB of the large cell and the second region corresponds to a region of the large cell extending outward from an outer edge of the first region.

Example 14 can include or use, or can optionally be combined with the subject matter of at least one of Examples 1-13 to optionally include or use wherein the threshold is a first threshold, wherein determining if the location of the small cell eNodeB is within the first region or the second region further includes determining if the location of the small cell eNodeB is within a third region of the large cell transmission area, wherein the first, second, and third regions do not overlap. Example 14 can optionally include or use at least one of: (1) comparing the RSRP to a second threshold, the second threshold less than the first threshold, in response to determining the RSRP is less than or equal to the second threshold and less than the first threshold, determining the small cell eNodeB is within the third region, and wherein determining the small cell eNodeB is within the second region includes further determining that the RSRP is greater than the second threshold and less than or equal to the first threshold.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A Long Term Evolution (LTE) device configured to assign a Physical Cell Identity (PCI) code to a small cell eNodeB based on a location of the small cell eNodeB, wherein the LTE device is configured to:
   estimate a location of the small cell eNodeB based on at least one of Global Positioning System (GPS) coordinates of the location of the small cell eNodeB and an RSRP measured at the small cell eNodeB;
   determine if the location of the small cell eNodeB is within a first region of a first large cell transmission area of a first base station, a second region of hg fir large cell transmission area, a third region of a second large cell transmission area of a second base station, and a fourth region of a second large cell transmission area, wherein the first and second large cell transmission areas are contiguous, the first and second regions do not overlap, the third and fourth regions do not overlap, the second region surrounds the first region and is further from the first base station than the first region, the fourth region surrounds the third region and is further from the second base station than the third region;
   in response to determining the small cell eNodeB is within the first region, assign a PCI code from a first group of available PCI codes to the small cell eNodeB;
   in response to determining the small cell eNodeB is within the second region, assign a PCI code from a second group of available PCI codes to the small cell eNodeB;
   in response to determining the small cell eNodeB is within the third region, assign a PCI code from the first group of available PCI codes to the small cell eNodeB; and
   in response to determining the small cell eNodeB is within the fourth region, assign a PCI code from a third group of available PCI codes to the small cell eNodeB, wherein the first, second, and third groups of PCI codes are disjoint.

2. The LTE device of claim 1, wherein the device is configured to:
   estimate the location of the small cell eNodeB based on the RSRP measured at the small cell eNodeB;
   compare the RSRP to a threshold;
   in response to determining the RSRP is less than or equal to the threshold, determining the small cell eNodeB is within the second region; and
   in response to determining the RSRP is greater than the threshold, determining the small cell eNodeB is within the first region.

3. The LTE device of claim 2, wherein the LTE device is a large cell eNodeB.

4. The LTE device of claim 2, wherein the LTE device is the small cell eNodeB, and the small cell eNodeB is further configured to:

register to an Operations, Administration, and Maintenance (OAM) device;
receive the threshold value from the OAM; and
receive the first, second, and third sets of available PCI codes from the OAM.

5. The LTE device of claim 2, wherein the LTE device is an Operations, Administration, and Maintenance (OAM) device.

6. The LTE device of claim 2, wherein the assigned PCI code is chosen randomly from the respective first, second, and third groups of available PCI codes.

7. The LTE device of claim 1, wherein the location of the small cell eNodeB is estimated based on the GPS coordinates.

8. A method of assigning a Physical Cell Identity (PCI) code to a small cell eNodeB as a function of a location of the small cell eNodeB, the method comprising:
estimating the location of the small cell eNodeB based on at least one of Global Positioning System (GPS) coordinates of the location of the small cell eNodeB and an RSRP measured at the small cell eNodeB;
determining if the location of the small cell eNodeB is within a first region of a first large cell transmission area of a first base station, a second region of the first large cell transmission area, a third region of a second large cell transmission area of a second base station, and a fourth region of a second large cell transmission area, wherein the first and second large cell transmission areas are contiguous, the first and second regions do not overlap, the third and fourth regions do not overlap, the second region surrounds the first region and is further from the first base station than the first region, the fourth region surrounds the third region and is further from the second base station than the third region;
in response to determining the small cell eNodeB is within the first region, assigning a PCI code from a first group of available PCI codes to the small cell eNodeB;
in response to determining the small cell eNodeB is within the second region, assigning a PCI code from a second group of available PCI codes to the small cell eNodeB;
in response to determining the small cell eNodeB is within the third region, assign a PCI code from the first group of available PCI codes to the small cell eNodeB; and
in response to determining the small cell eNodeB is within the fourth region, assign a PCI code from a third group of available PCI codes to the small cell eNodeB, wherein the first, second, and third groups of PCI codes are disjoint.

9. The method of claim 8, wherein estimating the location of the small cell eNodeB based on the RSRP measured at the small cell eNodeB includes:
comparing the RSRP to a threshold;
in response to determining the RSRP is less than or equal to the threshold, determining the small cell eNodeB is within the second region; and
in response to determining the RSRP is greater than the threshold, determining the small cell eNodeB is within the first region.

10. The method of claim 9, further comprising:
registering the small cell eNodeB to an Operations, Administration, and Maintenance (OAM) device;
receiving the threshold value from the OAM; and
receiving the first, second, and third sets of available PCI codes from the OAM.

11. The method of claim 10, wherein assigning the PCI code from the first group of available PCI codes includes randomly assigning the PCI code from the first group of available PCI codes.

12. The method of claim 9, wherein the threshold is a first threshold, wherein determining if the location of the small cell eNodeB is within the first region or the second region further includes determining if the location of the small cell eNodeB is within a fifth region of the first large cell transmission area, wherein the first, second, and fifth regions do not overlap, and the method further comprises:
comparing the RSRP to a second threshold, the second threshold less than the first threshold;
in response to determining the RSRP is less than or equal to the second threshold and less than the first threshold, determining the small cell eNodeB is within the third region; and
wherein determining the small cell eNodeB is within the second region includes further determining that the RSRP is greater than the second threshold and less than or equal to the first threshold.

13. The method of claim 8, further comprising:
communicating to an Operations, Administration, and Maintenance device which PCI code was assigned.

14. The method of claim 8, wherein the first region corresponds to a region of the first large cell transmission area extending outward from an eNodeB of the first large cell and the second region corresponds to a region of the large cell transmission area extending outward from an outer edge of the first region.

15. A non-transitory computer readable storage device comprising instructions stored thereon, the instructions, which when executed by a machine, cause the machine to perform operations comprising:
estimating a location of a small cell eNodeB based on at least one of Global Positioning System (GPS) coordinates of the small cell eNodeB and an RSRP measured at the small cell eNodeB;
determining if the location of the small cell eNodeB is within a first region of a first large cell transmission area of a first base station, a second region of the first large cell transmission area, a third region of a second large cell transmission area of a second base station, and a fourth region of a second large cell transmission area, wherein the first and second large cell transmission areas are contiguous, the first and second regions do not overlap, the third and fourth regions do not overlap, the second region surrounds the first region and is further from the first base station than the first region, the fourth region surrounds the third region and is further from the second base station than the third region;
in response to determining the small cell eNodeB is within the first region, assigning a PCI code from a first group of available PCI codes to the small cell eNodeB;
in response to determining the small cell eNodeB is not within the first region, assigning a PCI code from a second group of available PCI codes to the small cell eNodeB;
in response to determining the small cell eNodeB is within the third region, assign a PCI code from the first group of available PCI codes to the small cell eNodeB; and
in response to determining the small cell eNodeB is within the fourth region, assign a PCI code from a third group of available PCI codes to the small cell eNodeB, wherein the first, second, and third groups of PCI codes are disjoint.

16. The storage device of claim 15, further comprising instructions stored thereon, which when executed by the machine, cause the machine to further perform operations comprising: comparing the RSRP to a threshold;
   in response to determining the RSRP is less than or equal to the threshold, determining the small cell eNodeB is within the second region; and
   in response to determining the RSRP is greater than the threshold, determining the small cell eNodeB is within the first region.

17. The storage device of claim 16, further comprising instructions stored thereon, which when executed by the machine, cause the machine to further perform operations comprising:
   registering the small cell eNodeB to an Operations, Administration, and Maintenance (OAM) device;
   receiving the threshold value from the OAM; and
   receiving the first, second, and third sets of available PCI codes from the OAM.

18. The storage device of claim 16, wherein the instructions for assigning the PCI code from the first group of available PCI codes include instructions for randomly assigning the PCI code from the first group of available PCI codes.

19. The storage device of claim 16, further comprising instructions stored thereon, which when executed by the machine, cause the machine to further perform operations comprising:
   communicating to an Operations, Administration, and Maintenance device which PCI code was assigned.

20. The storage device of claim 19, wherein the first region corresponds to a region of the first large cell transmission area extending outward from an eNodeB of the first large cell transmission area and the second region corresponds to a region of the first large cell transmission extending outward from outer edge of the first region.

* * * * *

UNITED STATES PATENT AND TRADEMARK OFFICE
CERTIFICATE OF CORRECTION

PATENT NO. : 9,838,932 B2  
APPLICATION NO. : 14/433815  
DATED : December 5, 2017  
INVENTOR(S) : Yiu et al.

Page 1 of 1

It is certified that error appears in the above-identified patent and that said Letters Patent is hereby corrected as shown below:

On the Title Page

Item (56)

On page 5, in Column 2, under "Other Publications", Line 57, delete "Project;Technical" and insert --Project; Technical-- therefor On page 5, in Column 2, under "Other Publications", Line 58, delete "Network;Further" and insert --Network; Further-- therefor On page 5, in Column 2, under "Other Publications", Line 58, delete "E-UTRAPhysical" and insert --E-UTRA Physical-- therefor On page 5, in Column 2, under "Other Publications", Line 59, delete "Aspects(Release 9)"," and insert --Aspects (Release 9)",-- therefor On page 6, in Column 1, under "Other Publications", Line 5, delete "Respnse" and insert --Response-- therefor On page 6, in Column 2, under "Other Publications", Line 3, delete "36PP" and insert --3GPP-- therefor On page 6, in Column 2, under "Other Publications", Line 4, delete "(36PP)," and insert --(3GPP),-- therefor In the Claims In Column 12, Line 24, in Claim 1, delete "hg fir" and insert --the first-- therefor Signed and Sealed this  
Twenty-eighth Day of May, 2019

Andrei Iancu  
*Director of the United States Patent and Trademark Office*